United States Patent [19]

Langen et al.

[11] Patent Number: 4,599,052

[45] Date of Patent: Jul. 8, 1986

[54] CONTROL DEVICE FOR METERING PUMP

[75] Inventors: Herbert Langen, Altbach; Fritz Reuter, Esslingen, both of Fed. Rep. of Germany

[73] Assignee: J. Eberspächer, Fed. Rep. of Germany

[21] Appl. No.: 714,694

[22] Filed: Mar. 21, 1985

[30] Foreign Application Priority Data

Mar. 22, 1984 [DE] Fed. Rep. of Germany ....... 3410529

[51] Int. Cl.⁴ .................. F04B 17/04; H01H 47/24
[52] U.S. Cl. .................................. 417/413; 417/417; 361/174; 361/175
[58] Field of Search ............... 417/413, 417; 361/173, 361/174, 175

[56] References Cited

U.S. PATENT DOCUMENTS

| 1,631,021 | 5/1927 | Dowling | 361/174 X |
| 3,056,332 | 10/1962 | Beregowitz | 361/174 X |
| 4,015,912 | 4/1977 | Kofink | 417/417 |
| 4,122,378 | 10/1978 | Brown | 417/417 X |

Primary Examiner—Carlton R. Croyle
Assistant Examiner—Theodore W. Olds
Attorney, Agent, or Firm—McGlew and Tuttle

[57] ABSTRACT

An electromagnetically operated fuel feed pump has an electronic control which comprises a phototransistor circuit with a delay element and a threshold switch. With this control a wear-free operation of the control is possible in a space-saving arrangement.

2 Claims, 3 Drawing Figures

CONTROL DEVICE FOR METERING PUMP

FIELD AND BACKGROUND OF THE INVENTION

The invention relates in general to pumps and in particular to a new and useful control device for a fuel feed pump with an electromagnetically driven piston rod having one end with a control membrane and an opposite end with a control head adjustable in height.

Such pumps are used for fuel proportioning in motor independent heating systems using extra gasoline or diesel fuel. With them small quantities of fuel must be transported reliably. A metering pump is used for the dosage of the fuel. In the known applications for heating equipment with an output between 1000 and 20,000 kcal/h, fuel quantities of e.g. 0.2 to 3 liter/h must be conveyed in an even flow.

The simplest device for fuel transport results through the use of a float regulator with a membrane pump. The membrane pump conveys the fuel into a float regulator, in which the fuel level is maintained constant, relative to a fuel nozzle downstream of the fuel flow. This known device conveys the fuel quantity in a flow constant in time. It has the disadvantage that the fuel quantity must be adapted to the minimum conveyed combustion air quantity, so that the heater will not produce soot at underload.

Known also are metering pumps with pulse generators (see U.S. Pat. No. 3,699,354; German Pat. No. 12 73 992). These pumps are constructed as electromagnetic piston pumps. The electromagnet is designed as a solenoid, the pump piston moving in the interior thereof. These metering pumps work as volumetrically conveying pumps; at every current pulse the piston moves back and forth once, the suction stroke being brought about in the known devices by a return spring. These pumps operate independently of pressure without an after-connected nozzle, they convey fuel according to the number of strokes and displacement volume of the pump.

In these pumps the pulse generator forms an important part. As pulse generators are known e.g. according to German OS 17 63 735 (U.S. Pat. No. 3,380,387) control means where the pulse delivery occurs through a unit consisting of electric motor with a step-down transmission a permanent magnet and a transistor, there being arranged on the revolving part of a worm wheel driven by the motor a permanent magnet which cooperates with a magnetic switch and which in turn controls the base of a transistor through which the pump then receives its pulses. Such pumps are used exclusively as metering pumps. Further, arrangements have become known where the pulse generator consists of a perforated disc with a drive as well as of a photo diode and photo element, where the drive of the perforated disc is arranged on the drive shaft of the combustion air motor belonging to the heating system and where the perforated disc extends into the space between the photo diode and photo element, so that the ray path between photo diode and photo element is temporarily interrupted. These pumps can be used only as metering pumps and their operation is dependent on the parameters of the heating system. These known arrangements, however, are very costly and trouble prone and cannot be used as fuel pumps.

SUMMARY OF THE INVENTION

The invention provides a control device on a fuel feed pump of the species which has been an especially simple design and is suitable for long term operation in vehicle heaters and which is compact. In fuel transport brought about by the compressive force of the return spring, this pump is dependent on the counter-pressure. This means that at low counter pressure, as is the case in the transport of air bubbles, the pump's number of strokes per unit time, the frequency, increases substantially. This has the advantage, over pulse pumps with given frequency, that a rapid filling of the lines with fuel is obtained.

The control device of the invention is characterized in that in a fuel feed pump, with an electromagnetically driven piston rod, there is arranged, in the section between the upper dead center and the lower dead center position of the piston rod, a phototransistor control including an electronic delay switchable by the passage of the control head of the piston rod. With this control device it is achieved that when the piston is in the lower dead center position, the magnet coil of the electromagnetic piston drive receives voltage and the pump coil is switched on, so that the piston rod is attracted and fuel is sucked into the pump chamber. The electronic delay causes a delay of the stroke motion. As the control head of the piston rod passes through the emitted light ray, the current flow is interrupted; the descent of the piston rod then occurs via a compression spring, and in this phase the fuel is conveyed into the pressure line. The electronic delay is in the range of milliseconds. The passage of the light ray can take place through an appropriate bore in the control head of the control piston.

According to a further development of the invention, the photo-transistor control is arranged in such a way that the light ray passes directly over the control edge of the control head. This leads to a reduced height. To achieve a further reduction of the dimensions it has proved desirable to construct the photo-transistor control of a reflection light barrier with a time function element for delay turn-off, this time function element consisting of an R-C combination known in itself. According to a further development lastly, a threshold switch is arranged following the photo receiver. Thereby rapid through switching is achieved and the power dissipation at the transistor is kept low, so that additional cooling is not necessary.

Accordingly it is an object of the invention to provide an improved pump which includes a movable piston member for effecting the pump which actuates an electronic circuit connected to effect a pumping delay.

A further object of the invention is to provide a pump having a movable piston with a spring acting on a piston member to effect a return thereof and an electromagnet which operates the pump piston and including an electronic device operated by the movement of the piston which provides an electronic current delay in the operation of the electromagnet affecting the movement of the piston.

A further object of the invention is to provide a metering pump particularly for automobile heaters which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
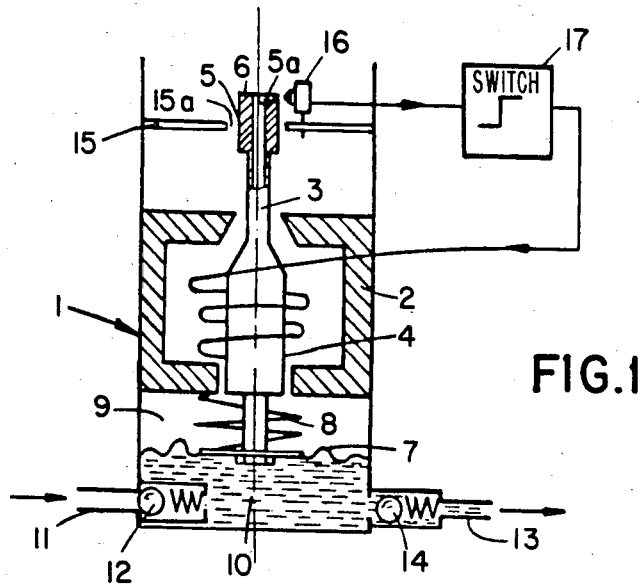
FIG. 1 is a schematic sectional view of a fuel constructed in accordance with the invention.

Referring to the drawings in particular the invention embodied therein comprises a fuel pump having a housing generally designated 1 which includes a free chamber 9 and a displacement media chamber 10 which are separated by a membrane or diaphragm 7 which is connected to a piston rod of a piston which moves in electromagnet 2 upon excitment of a magnetic coil 4. Piston edge has a control head 5 with a control edge 6 which moves past in a phototransistor control 16 which acts through a threshold switch 17 for regulating current to the electromagnet and its magnetic coil 4 after an electronically set delay.

Figure 2:
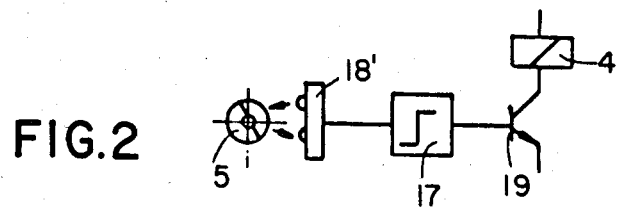
FIG. 2 is a schematic diagram of the electronic circuit for the pump shown in FIG. 1.

In the embodiment according to FIG. 1, there is arranged in the pump housing 1 the electromagnet 2, with the associated magnet coil 4 which in a known manner surrounds the piston rod 3. At its upper end, the piston rod 3 carries the control head 5, the upper edge of which acts as the control edge 6. At the lower end of piston rod 3, a membrane or diaphragm 7 is attached. In order to bring the piston rod 3 into the lower dead center position, a return spring 8 is provided. The free chamber 9 is located above the membrane 7 and the displacement medium chamber 10 is located below the membrane 7. The fuel to be conveyed gets into chamber 10 via an inlet or inflow 11 having a spring loaded suction or check valve 12. The fuel is supplied to a heater via an outlet or outflow 13 having a spring loaded compression or check valve 14. In the upper region of the pump a printed board 15 with a central cutout is arranged. The board 15 carries electronic components. The piston rod 3 with the control head 5 moves through the central cutout 15a of the board 15. On the printed board 15 the phototransistor control 16 is arranged. In the embodiment according to FIG. 2 a reflection light barrier 18' is arranged adjustable in height in order thus to be able to set the stroke, and is controlled by the control head 5 of the piston rod 3. The control head 5 acts as reflection surface. Alternatively the phototransistor control 16 is composed of a known photoelectric cell. In that case it is appropriate to provide the control head 5 with a passage bore or a slot 5a, in order to effect the control. Following the reflection light barrier 18 is a threshold switch 17, which permits rapid through switching, and thereafter a switching transistor 19.

Figure 3:
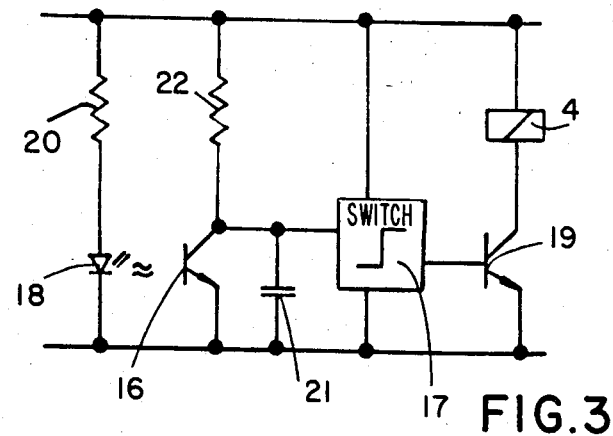
FIG. 3 is a circuit diagram for the pump.

FIG. 3 shows the respective circuit diagram. In it is shown additionally the arrangement of the series resistance 20 for the light source 18 and the R-C delay element consisting of a delay capacitor 21 and a delay resistor 22.

While specific embodiments of the invention have been shown and described in detail to illustrate the application of the principles of the invention, it will be understood that the invention may be embodied otherwise without departing from such principles.

What is claimed is:

1. A fuel pump comprising a pump housing having a free chamber, a displacement media chamber adjacent said free chamber, a diaphragm between said free chamber and said displacement media chamber, a pump piston having one end connected to said diaphragm and having an opposite end, a control head member connected to said opposite end of said pump piston and having an edge which is movable between two end positions with movement of said pump piston between two end positions, said control head member having a reflective surface, a phototransistor control fixed to said housing at a position between said two end positions of said control head member edge, said phototransistor control including a light source and a light receiver both facing said control head member for reflecting light of said light source onto said light receiver from said reflective surface, inlet and outlet means connected to said displacement media chamber for receiving and discharging media with backward and forward movement of said piston pump to pump media through said inlet means and said outlet means, electromagnetic drive means including a coil and connected to said pump piston for moving said pump piston backwardly and forwardly, and R-C time function delay elements connected to said light receiver for delaying a signal from said light receiver in response to passage of said reflective surface of said control head member, and a threshold switch having an input connected to said delay element and an output connected to said coil for powering said coil upon receiving said delayed signal to move said pump piston.

2. A fuel pump according to claim 1, wherein said light receiver comprises a phototransistor for receiving light reflected from said reflective surface, said R-C time function delay element being connected to said transistor and to said input of said threshold switch for generating the delayed signal and applying it to the input of said threshold switch, a switching transistor having a base connected to said outputs of said threshold switch, said switching transistor being connected to said coil, said electromagnetic drive means including a return spring engaged between said housing and said diaphragm for biasing said pump piston to move forwardly toward said displacement media chamber, said coil being engaged on said piston pump for moving said piston pump backwardly against biasing of said spring when said coil is activated by said switching transistor.

* * * * *